(No Model.)

T. MERRELL.
RAT TRAP.

No. 450,176. Patented Apr. 14, 1891.

Witnesses
A. Y. Trogdon
Jessie Trogdon

Thomas Merrell Inventor.

United States Patent Office.

THOMAS MERRELL, OF HINDSBOROUGH, ILLINOIS.

RAT-TRAP.

SPECIFICATION forming part of Letters Patent No. 450,176, dated April 14, 1891.

Application filed July 16, 1890. Serial No. 358,907. (No model.)

*To all whom it may concern:*

Be it known that I, THOMAS MERRELL, a citizen of the United States, residing at Hindsborough, in the county of Douglass and State of Illinois, have invented a new and useful Rat-Trap, of which the following is a specification.

My invention relates to that class of rat-traps known as the "automatic" trap, and the purpose and object of the invention is to catch rats (or other animals) by bait in conjunction with an oscillating platform, trigger, and cage, in which the oscillating platform is held in position by a trigger, and after the trigger is thrown the weight under the front end of the platform causes it to swing back to the proper level; and the invention consists in the combination of devices as set forth in my original application for Letters Patent.

Figure 1:
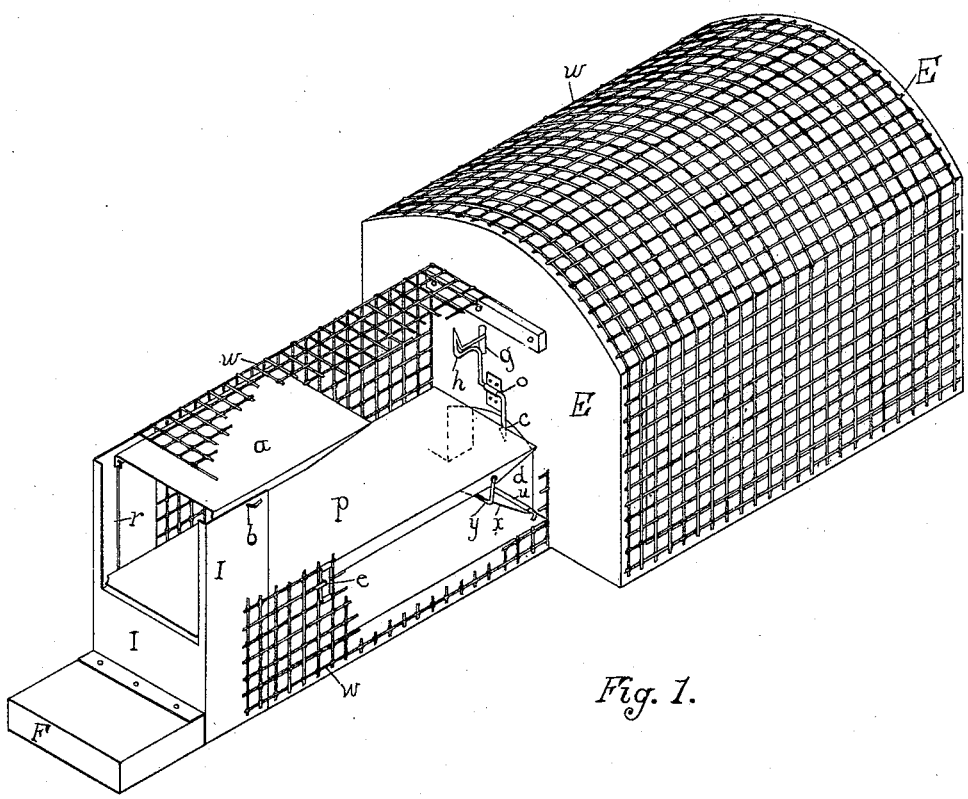
Figure 2:
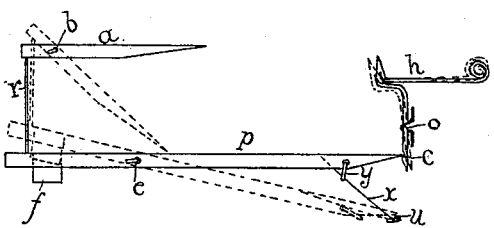
Figure 3:
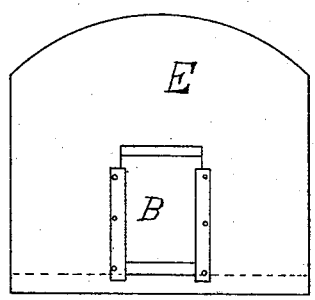

Figure 1 shows the complete rat-trap and cage. Fig. 2 is a side view of the platform P leading to the cage and the trigger and drop-doors $a$ and $x$ of trap. Fig. 3 shows the slide door B at rear of cage on the end thereof.

The floors of the rat trap and cage are made of wood, and the floor of the trap projects four inches in front at F, as shown in Fig. 1. The front and rear of cage E are of wood, and the cage and trap are both covered with wire-screen W, which is fastened securely to the wooden frame by small staples, and said platform is provided with a heavy weight at the front end at $f$, as shown in Fig. 2.

The front end and sides I of trap, the platform P, drop-doors $a$ and $x$ are sheet-iron. The drop-door $a$ is swung on a pivot at $b$, (which extends through to the other side of the frame,) and said door is connected to platform P by an iron pivot-rod $r$, so that when the trap is thrown and platform drops down, the drop-door $a$ falls down and closes the entrance to the trap. The drop-door $x$ is fastened by the pivot $u$ to the floor in front of the entrance $d$, and the upper end rests on the rod $y$, which is fastened to the platform by pivots on either side. The platform P has a flange on either side the whole length of platform to which the pivots are attached by holes through the flanges. The pivot upon which the platform P rests and moves up and down is attached on either side to wire-mesh by a strip of tin set in mesh by a loop over the wire at each end, or may be soldered to the wire sufficiently long to fasten to mesh. Platform P rests on front of trap at I when set. The sheet-iron front end of trap at $i$ has flanges, so that the front end of platform P works up and down in said flanges so it will maintain its proper position, and the flanges stiffen front end of trap, as shown in Fig. 1.

The front of cage E is provided with an opening $d$ and a trigger, which is made of iron, and is fastened to the front of cage at $o$ by a clamp through which the rod works loosely, and the lower end of the trigger-rod has a notch at $c$ upon which the end of platform P rests. The rod is shaped into a sharp hook for the bait, as shown at $h$, and the rod extends through the opening $g$ and is finished in a heavy coil, as shown in Fig. 2. The coil acts as a weight to press the notch $c$ under the platform and hold it up until the trigger is pulled. When the bait on hook $h$ is pulled, the weight of the coil is overbalanced, and this throws notch $c$ from under the platform P, which drops down and is held down by the weight of the rat, and the rat is thrown into cage or runs into cage. The rear end of the cage has a slide-door B, as shown in Fig. 3, to be raised to let the rats out and lowered to keep them in.

Fig. 2 shows the position of the platform, trigger, and drop-doors of the trap when open, and the dotted lines show their positions when the trap is thrown. The end of trap at I is open, and when the rat passes into the trap he runs along the platform P to the bait-hook $h$, and pulling trigger or by eating bait the notch $c$ slips from under platform P, and his weight tips the platform and it falls to the floor, as shown by the dotted lines in Fig. 2, and the drop-door $a$ falls down, as shown by the dotted lines in Fig. 2, to shut off escape. The rat passes into the cage through the opening $d$, and the weight $f$ causes platform to resume horizontal position and set the trigger.

I claim that the trap is automatic and sets itself as often as it is thrown. The weight $f$ causes platform to rise when the rat runs off and the end of the platform strikes the lower end of trigger-rod and presses the rod back until the platform rests on the notch $c$, where it is held by the weight of the coil on the trigger, and then the trap is set ready for next rat.

I claim as my invention and desire to secure by Letters Patent—

In an automatic trap, the oscillating platform P, provided with the weight $f$ at its front end, and connecting-rod $r$, in combination with the drop-door $a$, the trigger $h$, the cage E, the drop-door $x$, and the slide-door B, and the opening $d$, all constructed and arranged to operate substantially as and for the purpose set forth.

THOMAS MERRELL.

Witnesses:
A. Y. TROGDON,
ALICE TROGDON.